United States Patent [19]

Raycher et al.

[11] Patent Number: 4,705,424
[45] Date of Patent: Nov. 10, 1987

[54] STUD SYSTEM FOR SECURING ABRASION RESISTANT MEMBERS

[75] Inventors: Robert J. Raycher; Charles C. Pease, both of Vincentown, N.J.

[73] Assignee: KSM Fastening Systems Inc., Morrestown, N.J.

[21] Appl. No.: 744,803

[22] Filed: Jun. 13, 1985

[51] Int. Cl.[4] ............................................. F16B 12/04
[52] U.S. Cl. ................................... 403/266; 403/271; 403/372; 403/406.1
[58] Field of Search .................. 403/405.1, 406.1, 270, 403/272, 271, 10, 179, 404, 372, 261, 266

[56] References Cited

U.S. PATENT DOCUMENTS

| | | | |
|---|---|---|---|
| 2,414,270 | 1/1947 | O'Connor | 403/271 |
| 3,027,609 | 4/1962 | Parkin et al. | 403/292 |
| 3,226,140 | 12/1965 | Voegeli | 403/272 |
| 3,481,634 | 12/1969 | Rondeau | 403/272 |
| 3,575,448 | 4/1971 | Licari | 403/272 |
| 3,747,291 | 7/1973 | Perigo et al. | 403/266 |
| 4,130,751 | 12/1978 | Gordon | 403/270 |

*Primary Examiner*—Cornelius J. Husar
*Assistant Examiner*—Peter M. Cuomo
*Attorney, Agent, or Firm*—Charles F. Duffield

[57] ABSTRACT

Method and apparatus for securing abrasion resistant members to metallic surfaces to line the metallic surfaces for protection against wear is disclosed. The abrasion resistant members include an aperture therein having a taper in the bottom of the aperture. An end weldable stud of length less than the thickness of the abrasion resistant member is welded through the aperture to the metallic surface to be lined. A cup shaped spring retainer clip having side walls of dimension greater than the aperture and a stud engaging aperture of dimension less than the diameter of the stud is driven over the stud through the aperture of the abrasion resistant member into engagement with the taper of the aperture of the abrasion resistant member to draw the abrasion resistant member into firm securement with the metallic surface. An abrasion resistant plug is secured within the aperture of the abrasion resistant member following installation.

7 Claims, 6 Drawing Figures

STUD SYSTEM FOR SECURING ABRASION RESISTANT MEMBERS

BACKGROUND OF INVENTION

The present invention is concerned with the art of securing abrasion resistant members such as ceramic tiles to metallic surfaces to protect the surfaces against abrasion.

Apparatus such as centrifuges, pneumatic conveyors, conveyor pipes, vibrating feeders, feed chutes and a multitude of other such apparatus are commonly used to convey abrasive and/or chemically destructive material such as coal fines, ceramics, cement, lime, grain and glass. When these materials are conveyed in direct contact with the metallic surface of the apparatus, excessive and expensive wear occurs due to the abrasive or chemical action of the materials with the metallic surface of the apparatus.

For a number of years, the metallic surfaces of apparatus as the foregoing have been protected by lining the effected areas thereof with ceramic tiles. These tiles come in various lengths, widths and thicknesses depending upon the particular application. As an example, a typical tile would be ½ inch thick and, for flatware, 3×6 inches in width and length and for curved material of approximately the same thckness and length and width but formed on a radius for the desired curved surface. These tiles are basically alumina which is extremely hard and thus wear resistant and also resistant to chemical attack.

One manner of securing the tiles in place is to use an adhesive material on the surface of the tile to be placed into engagement with the metallic surface. One of the drawbacks of this arrangement is that the adhesive material does not provided the required bonding force in many cases and also does not hold up well in environments where the material being conveyed is at an elevated temperature.

Another application or method for securing the tiles in place is to provide an aperture within the tiles which, in some cases, may be tapered. The tiles are positioned upon the metallic surface to be lined and a conventional stick welding apparatus is used to form a plug weld within the aperture to secure the tile in place. Another variation of this method is to place a split metallic ring within the aperture which is forced into place within the aperture and to weld the ring by the conventional stick welding process to the metallic surface.

There exists a third method and/or structure for securing the ceramic tile in place to the surface to be lined. In this instance, the tiles also include a tapered aperture within the tile. An end weldable stud is used where the stud is likewise tapered at an angle corresponding to that of the taper of the aperture of the tile. The outer dimension of the stud is slightly greater than the dimension of the taper within the tile at the point of minimum dimension of the taper. The stud is placed within the aperture of the tile toward the point of minimum dimension of the taper thereof and into contact with the metallic surface to be lined and welded in place by the stud end welding technique. As the stud melts at its end being welded, the stud is pulled downwardly into the taper of the aperture of the tile to secure the tile in place upon the metallic surface to be lined.

The method or procedure for securing tiles to metallic surfaces wherein a conventional stick welding apparatus is used has the drawback that the stick welding is extremely slow and is thus expensive. Likewise, the tapered metallic stud utilized in the alternate procedure includes a rather substantial amount of material and also is of a configuration that must be made upon a screw machine rather than upon a cold header. For this reason, while the tapered plug can be welded more efficiently and inexpensively by the stud end welding process, this advantage is taken away by the excessive cost of the tapered stud itself due to the inclusion therein of the excessive material and the expensive method of manufacturing upon a screw machine. In both instances wherein either the conventional stick welding is used to form a plug weld or the tapered stud is used, there is the further problem encountered that the tile is only secured against the surface by the relatively loose fit of the plug weld or tapered stud weld to the metallic surface. Any expansion of the material or vibration can cause the tiles to become loose with the ultimate result of fracture and loss of the tile.

The afore-described methods and means for securing ceramic tiles to metallic surfaces to be lined for protection against abrasion all include the common drawback of excessive expense, and or time consuming in installation, and/or lack of ability to withstand elevated temperatures and finally, the inability to provide a strong and resilient interconnection of the tile with the metallic surface. The industry needs an inexpensive tile fastening system both in material costs and in installation time which will provide a strong and resilient bond of the tile to the metallic surface to be lined with the abrasion resistant material.

SUMMARY OF INVENTION

The present invention provides a stud and clip combination and method by which ceramic tiles providing abrasion and chemical resistance may be secured to metallic surfaces to be lined in a quick, efficient, and cheap manner and, following installation, resiliently and firmly secures the tile in place.

The ceramic tiles utilized with the present invention are conventional ceramic tiles and include therein one or more apertures. At the bottom of the aperture or adjacent the surface of the tile to engage the metallic surface to be lined there is formed a taper converging inwardly in the direction of the aperture toward the metallic surface.

In accordance with the present invention, an end weldable stud is provided. The stud is of a length less than the thickness of the tile to be secured and of a diameter substantially less than the diameter of the aperture within the tile. The stud has a smooth and straight external circumferential surface from its welded end to its unwelded end.

A cup shaped spring retainer clip is provided. The spring retainer clip includes side walls which are of a diameter in excess of the minimum diameter of the The cup shaped retainer clip includes an upwardly projecting bottom wall. The bottom wall includes centrally thereof a stud engaging aperture. The stud engaging aperture is of a diameter slightly less than the diameter of the stud and is adapted to fit over the stud into firm gripping engagement with the stud.

During assembly, the tile is placed in position upon the metallic surface and the stud welded in place upon the metallic surface through the clip receiving aperture of the tile. Thereafter, the spring retainer clip is positioned through the clip retaining aperture upon the unwelded end of the stud and driven upon the stud until the side walls of the spring retainer clip engage the clip engaging taper of the aperture of the tile to secure the tile in place. Thereafter, an abrasion resistant plug of diameter approximating the diameter of the clip receiving aperture is secured in place within the aperture by means of an adhesive or other suitable material.

DETAILED DESCRIPTION OF INVENTION

Figure 1:
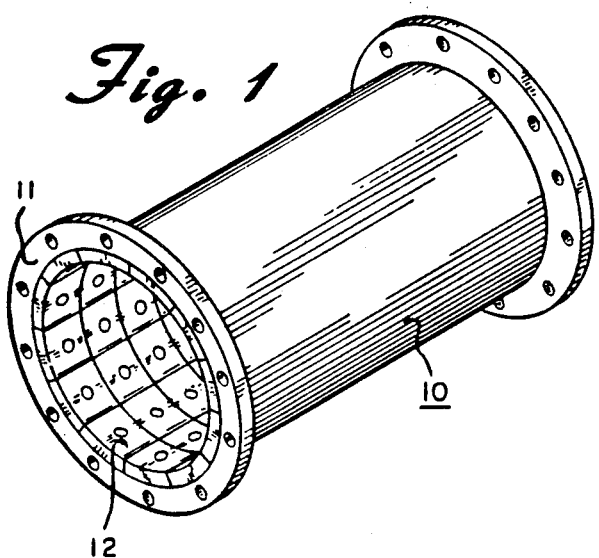
FIG. 1 is a perspective view of an environment within which the stud and clip combination of the present invention may be used.

The stud and clip combination of the present invention for securing abrasion resistant materials is shown in FIGS. 1-6 of the drawing. FIG. 1 illustrates a typical environment within which the stud and clip combination of the present invention may be utilized. A typical type of apparatus to be lined with abrasion resistant material would be a pneumatic conveyor pipe 10 as shown in FIG. 1. This pipe is of a prescribed length and utilizes connecting flanges 11 to interconnect various sections of the pipe. Disposed within the inner circumference of the pipe 10 is a plurality of individual curved ceramic tiles 12 which are in side by side position to provide a continuous internal wear abrasion resistant lining. These tiles are typically formed of a chemical and wear abrasion resistant material such as alumina.

Figure 2:
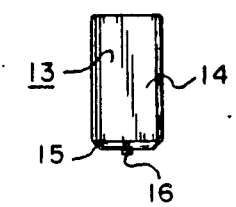
FIG. 2 is an elevational view of the stud of the present invention.
Figure 3:
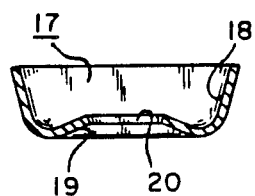
FIG. 3 is a sectional elevational view of the spring retainer clip of the present invention.
Figure 4:
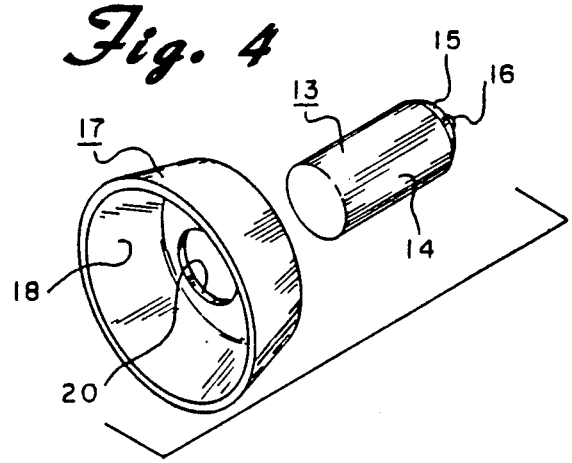
FIG. 4 is a perspective view of the spring retainer clip and stud of the present invention.

In accordance with the present invention and as more particularly shown in FIGS. 2-4, there is first provided a stud 13. The stud has a smooth and uniform cylindrical external surface 14. The weld end of the stud is formed of a chamber 15 which terminates with a conventional fluxing material 16 disposed within the weldable end of the stud. For reasons as will be apparent hereinafter, the length of the stud 13 is substantially less than the thickness of the tile to be secured.

In accordance with the present invention, a cup shaped spring retainer clip 17 is provided. The spring retainer clip is formed of a resilient spring material.

The spring retainer clip 17 includes an upturned side wall 18. The bottom end of the side wall 18 transitions into an upwardly projecting bottom wall 19. A stud engaging aperture 20 is formed generally centrally of and within the upwardly projecting bottom wall 19.

Figure 5:
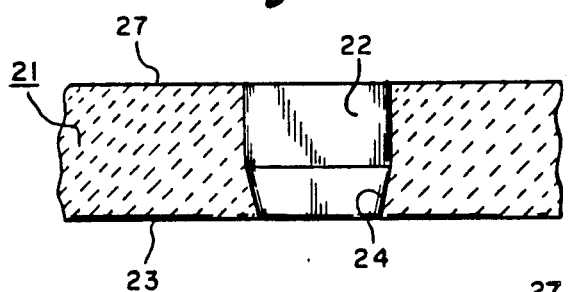
FIG. 5 is a sectional elevational view of an abrasion resistant member in accordance with the present invention.
Figure 6:
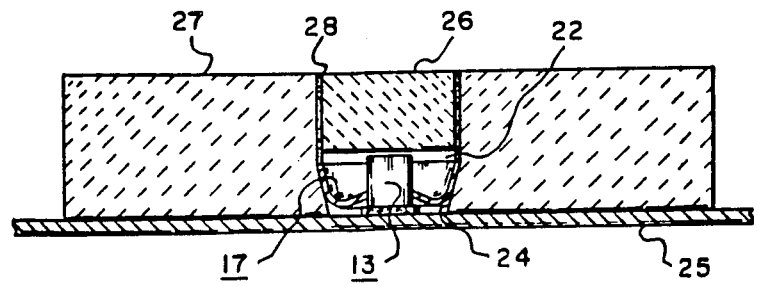
FIG. 6 is a sectional elevational view of the abrasion resistant member, stud and stud retaining clip of the present invention is assembled configuration upon a metallic surface.

Shown in FIG. 5 is an abrasion resistant member or tile 21 which may be utilized with the stud and clip combination of the present invention. The tile 21 is of a prescribed length, width and thickness. The tile 21 includes, through the thickness thereof in one or more positions, a clip receiving aperture 22.

The clip receiving aperture 22 is generally of a straight cylindrical configuration through the thickness of the tile 21 until the bottom thereof adjacent the surface 23 to be positioned against the metallic surface to be lined. The bottom of the clip receiving aperture 22 includes a clip engaging taper 24. The clip engaging taper 24 tapers from a dimension equal to the circumference of the clip receiving aperture 22 inwardly to a lesser dimension in the direction of the surface 23.

The upper edge of the side wall 18 of the spring retainer clip 17 is of a diameter slightly smaller than the diameter of the clip receiving aperture 22 but of a dimension in excess of the minimum dimension of the clip engaging taper 24. In the opposite sense, the stud engaging aperture 20 of the spring retainer clip 17 is of a dimension slightly smaller than the diameter of the stud 13.

During assembly of the tile, stud and clip assembly of the present invention, the tile 21 is placed in position upon the metallic surface 25 to be lined in side by side position with other tiles. The clip engaging taper 24 is positioned adjacent the metallic surface 25.

The metallic stud 13 is positioned downwardly through the clip receiving aperture 24 generally centrally thereof and welded into place by the stud end welding technique. Thereafter, the spring retainer clip 17 is positioned downwardly through the clip receiving aperture 22 until the stud engaging aperture 20 thereof is in contact with the unwelded end of the stud 13. Thereafter, a suitable tool (not shown) is positioned downwardly through the clip receiving aperture 22 into engagement with the upper surface of the spring retainer clip 17. A force is applied to the tool by means of such devices as a hammer or the like to force the spring retainer clip 17 downwardly along the stud 13 until the side wall 18 of the spring retainer clip 17 comes into engagement with the clip engaging taper 24. As further force is applied, the resiliency of the spring retainer clip 17 will provide a positive and resilient grip of the spring retainer clip 17 upon the stud 13 and the clip engaging taper 24 of the tile 21 to thus firmly, positively and resiliently secure the tile 21 in place upon the metallic surface 25.

In an alternative embodiment, the stud 13 and spring retainer clip 17 may be of a preassembled nature. In this embodiment, the spring retainer clip 17 is positioned along the length of the stud 13 a distance from the weldable end of the stud in excess of the depth of the clip engaging taper 24. In this manner, the spring retainer clip 17 automatically centers the stud 13 within the clip retaining aperture 24 but does not come into contact with the clip engaging taper prior to or following the welding operation. Following welding, the spring retainer clip setting tool is used in the manner as described above.

The length of the stud 13 is designed such that it will project upwardly from the metallic surface only a distance as required to permit setting of the spring retainer clip and also to provide a sufficient thickness of the tile 21 above the unwelded end of the stud.

Following setting of the spring retainer clip 17 upon the stud 13, an abrasion resistant plug 26 is positioned within the clip receiving aperture 22. The abrasion resistant plug 26 is of a diameter approximating the diameter of the clip receiving aperture 22 and of a thickness approximating the distance between the unwelded end of the stud 13 and the upper surface 27 of the tile 22.

The abrasion resistant plug 26 may be secured in place within the clip receiving aperture 22 of the tile 21 by means of a suitable adhesive 28. In this manner, the abrasion resistant plug 26, once in place, provides a smooth continuous upper surface to the tile 21.

A typical insulation would be the utilization of a tile of ½ inch thickness and a length and width of 6 inches and 3 inches respectively. The clip receiving aperture would be approximately ¾ inches in diameter. The spring retainer clip would be of a diameter approximately that of the clip receiving aperture and of a depth of approximately ¼ inch. The diameter of the stud would be approximately ¼ inch. The length of the stud would be something slightly less than ½ inch. In greater thicknesses of tile material, the stud would be of that same approximate length inasmuch as the length of the stud is essentially a function of the requirement that there be projecting above the spring retainer clip sufficient material for the chuck of the stud welding gun to grip the stud.

The invention has been described in respect to a particular embodiment thereof set forth in the specificiation and the drawing. However, no limitation as to the scope of the invention is thereby intended inasmuch as other variations and modifications thereof will become apparent to those skilled in the art from the foregoing disclosure. Accordingly, the scope of the invention is not to be so limited but is intended to be determined by the claims.

What is claimed is:

1. A stud and clip combination of securing an abrasion resistant member of a prescribed thickness and having a clip engaging aperture therethrough to metallic surfaces to line such surfaces with the abrasion resistant member for protection against abrasion comprising:
    an end weldable stud having an axial length less than the thickness of the abrasion resistant member to be secured and adapted to be welded to the metallic surface by a stud end welding technique; and
    a spring retainer clip having a side wall portion with a radial dimension which resiliently engages the aperture of the abrasion resistant member and a stud engaging aperture of dimension to resiliently engage the end weldable stud whereby the spring retainer clip is secured upon the stud and into engagement with the aperture of the abrasion resistant member in order to secure the abrasion resistant member in place upon the metallic surface.

2. The stud and clip combination of claim 1 wherein the abrasion resistant member includes a clip engaging taper within the clip engaging aperture adjacent one end of the aperture.

3. The stud and clip combination of either claims 1 or 2 wherein the spring retainer clip is cup shaped having a side wall and an upwardly projecting bottom wall.

4. The stud and clip combination of claim 1 further including a wear resistant plug with a dimension complementary to the clip engaging aperture adapted to fill in the clip engaging aperture following welding of the end weldable stud and securing of the spring retainer clip in place.

5. The method of securing abrasion resistant members of a prescribed thickness and having a clip engaging aperture therethrough to metallic surfaces to line such surfaces with the abrasion resistant members for protection against abrasion comprising the steps of:
    placing the abrasion resistant members in place upon the metallic surface:
    welding an end weldable stud of an axial less than the thickness of the abrasion resistant members by the stud end welding technique to the metallic surface through a aperture of the abrasion resistant members;
    placing a spring retainer clip having a side wall portion with a radial dimension which resiliently engages the aperture of the abrasion resistant members and a stud engaging aperture having dimension which resiliently engages the end weldable stud upon the end weldable stud and driving the spring retainer clip upon the stud in the direction of the metallic surface to secure the abrasion resistant members in place upon the metallic surface.

6. The method of securing abrasion resistant members upon metallic surfaces of claim 5 further including the step of securing in place an abrasion resistant plug of dimension complementary to the dimension of the clip engaging aperture within the clip engaging aperture.

7. The method of securing abrasion resistant members to metallic surfaces of claim 5 further including the step of preassembling the spring retainer clip upon the end weldable stud prior to the welding of the end weldable stud to the metallic surface.

* * * * *